(12) United States Patent
De Baat Doelman

(10) Patent No.: US 6,706,170 B1
(45) Date of Patent: Mar. 16, 2004

(54) SYSTEM FOR TREATING FLUIDS IN AN ELECTRIC FIELD

(76) Inventor: Jan Pieter De Baat Doelman, Erasmusgracht 29/III, Amsterdam (NL), NL-1056 BC ( * ) Notice: Subject to any disclaimer, the term of this patent is extended or adjusted under 35 U.S.C. 154(b) by 0 days.

(21) Appl. No.: 09/913,407

(22) PCT Filed: Feb. 11, 2000

(86) PCT No.: PCT/NL00/00084
§ 371 (c)(1),
(2), (4) Date: Nov. 1, 2001

(87) PCT Pub. No.: WO00/47522
PCT Pub. Date: Aug. 17, 2000

(30) Foreign Application Priority Data

Feb. 15, 1999 (NL) .............................. 1011304

(51) Int. Cl.[7] .................................. C02F 1/48
(52) U.S. Cl. .................. 210/85; 210/143; 210/222; 210/243; 204/555; 204/556
(58) Field of Search ............. 210/85, 87, 143, 210/222, 223, 243, 748, 94, 96.1, 323; 204/228.1, 229.2, 554, 555, 556; 340/660; 324/207.2

(56) References Cited

U.S. PATENT DOCUMENTS

| 4,755,288 A | 7/1988 | Mitchell et al. .............. 210/85 |
| 5,074,998 A | * 12/1991 | De Baat Doelman ....... 210/222 |
| 5,106,491 A | 4/1992 | Schulze et al. ............... 210/87 |
| 5,171,431 A | 12/1992 | Schulte ........................ 210/94 |
| 5,514,283 A | * 5/1996 | Stefanini ..................... 210/143 |
| 5,702,600 A | * 12/1997 | Pandolfo .................... 210/222 |
| 5,783,766 A | * 7/1998 | Tanaka ........................ 84/618 |
| 6,033,565 A | * 3/2000 | Van Heesch et al. ....... 210/243 |
| 6,063,267 A | * 5/2000 | Crewson et al. ............ 210/143 |

FOREIGN PATENT DOCUMENTS

| EP | 0 357 102 A2 | 3/1990 |
| JP | 03047582 | 2/1991 |

* cited by examiner

*Primary Examiner*—Joseph Drodge
(74) *Attorney, Agent, or Firm*—Young & Thompson

(57) ABSTRACT

System for treating fluids, especially water, in a pipe to resist scale deposits from building up in the pipe, includes a field generating coil (10) mounted exteriorly of the pipe, an electronic circuit (14) for energizing the coil to develop an alternating electromagnetic field in the fluid, a sensor (18) for sensing a parameter related to the functioning of the system and for generating a parameter dependant signal, a feed back circuit for feeding back the parameter dependent signal to the electronic circuit to control the circuit, wherein the sensor comprises a field measuring coil (16) mounted exteriorly of the pipe near the field generating coil, the feed back circuit comprises the electronics which together with the measuring coil acts as a field strength meter.

5 Claims, 1 Drawing Sheet

SYSTEM FOR TREATING FLUIDS IN AN ELECTRIC FIELD

CROSS-REFERENCE TO RELATED APPLICATIONS

This is the 35 USC §371 National Stage of International application PCT/NL00/00084 filed on Feb. 11, 2000, which designated the United States of America.

FIELD OF THE INVENTION

The invention relates to a system for treating fluids, especially water, in a pipe to resist scale deposits from building up in the pipe comprising
- a field generating coil mounted exteriorly of the pipe,
- an electronic circuit for energising the coil to develop an alternating electromagnetic field in the fluid,
- a sensor for sensing a parameter related to the functioning of the system and for generating a parameter dependent signal,
- a feed back circuit for feeding back said parameter dependent signal to said electronic circuit to control said circuit.

BACKGROUND OF THE INVENTION

Systems of this type or known from the prior art. Examples are described in EP0493559, DE19502990, DE19505642

In EP0493559 a system is described wherein the sensor consists of a microphone which is connected in physical contact with the pipe. The microphone picks up any sound that is generated as a result of turbulence inside the pipe. This turbulence relates to the surface effect on water passing through the pipe as well as over obstructions such as limescale deposits. The microphone output signal controls through the feed back circuit the characteristics of the energy supplied to the field generating coil. The supplied energy is related to the flow of water passing through the pipe and to the amount of limescale already build up within the system.

A sensor embodied as an electrode positioned in the wall of the tube and in contact with the fluid is described in DE19502990. The electrode and the thereto connected measuring circuit measures the water velocity. Dependent on the measured velocity the energy supplied to the field generating coil is varied. A disadvantage of this system relies in the fact that the electrode has to be installed inside the pipe, in other words, operations on the pipe have to be performed.

A Similar construction is described in DE19505642. The sensor comprises in this case an elastic electrode carrying a number of strain gauges. Dependent on the velocity of the fluid in the pipe the strain gauge signal varies and therewith the amount of power supplied to the field generating coil varies.

A general problem in all these prior art apparatuses is the calibration of the apparatus once it is installed. The influence of the field generated by the field generating coil is dependent on the induction in the fluid. This induction is dependent on en large number of different factors such as:
- electrical properties of the fluid, e.g. the electrical conductivity, the higher the conductivity the lower the induction,
- the dimensions and the material of the pipe,
- the influence of external fields generated e.g. by nearby electrical apparatuses such as washing machines, dryers, ironing apparatuses, pumps, etc.

Most of these factors are not predictable, or at least not accurate enough.

The aim of the invention is now to provide an apparatus of the above-mentioned type which is embodied such that the influence of all these factors is taken into account.

SUMMARY OF THE INVENTION

In agreement with this object the invention now provides an apparatus as defined in the first paragraph of this specification, which is characterised in that
- the sensor comprises a field measuring coil mounted exteriorly of said pipe near the field generating coil,
- the feed back circuit comprises the electronics which together with said measuring coil acts as a field strength meter.

By measuring the real field developed under practical circumstances information is obtained on the basis of which the electronic circuit for energising the coil to develop an electromagnetic field in the fluid can be adjusted such that even under varying circumstances the proper field strength is generated The field measuring coil can be positioned at various locations, such as around the field generating coil. This position however has the disadvantage that the configuration within the field generating coil is not identical toe the configuration within the field measuring coil. Therefor it is preferred that the measuring coil is positioned alongside the field generating coil with no or small intermediate distance.

It is preferred to use a feedback circuit in the same manner as in the above described prior art. In other words it is preferred that the electronic circuit for energising the coil comprises an amplifier and a signal generator, whereby the amplification value is adjusted dependent on the signal from the field strength meter.

BRIEF DESCRIPTION OF THE DRAWINGS

The invention will be explained in more detail with reference to the attached drawings.

DETAILED DESCRIPTION OF THE INVENTION

Figure 1:
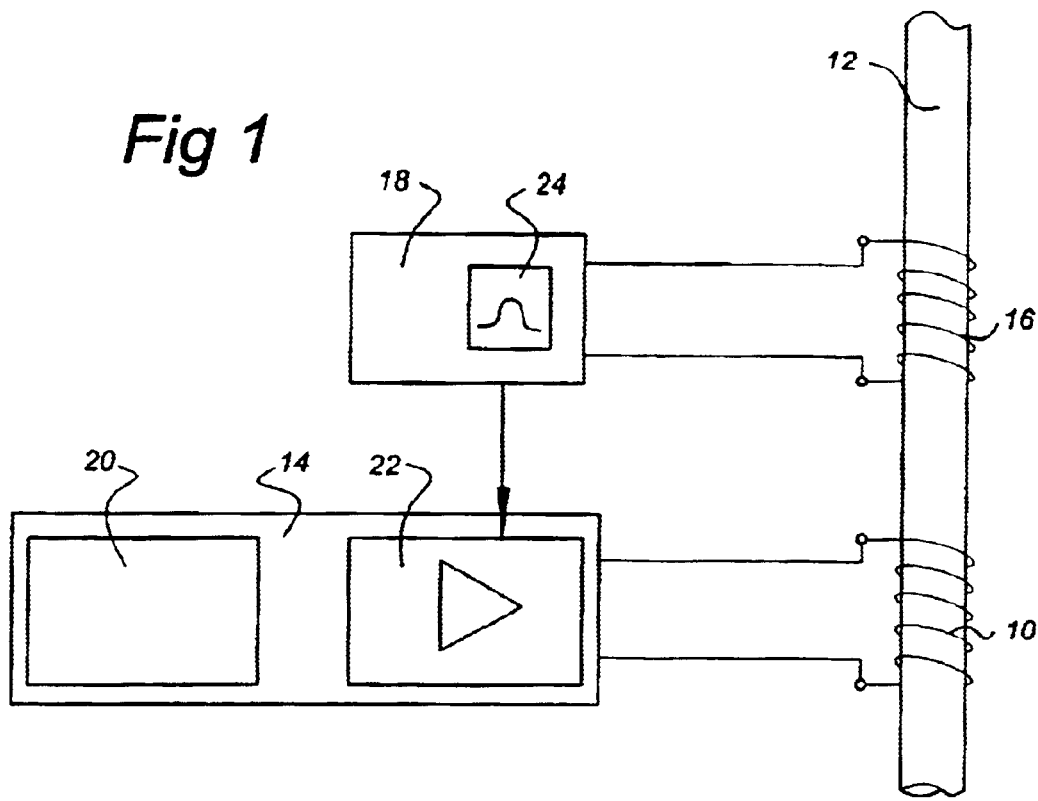
FIG. 1 illustrates a general schematical layout of a system according to the invention.

The system as illustrated in FIG. 1 comprises a field generating coil 10 mounted exteriorly of the pipe 12. The pipe 12 forms the flow path for a fluid which could be water, but also any other fluid, having the tendency to deposit limescale on the inner wall of the tube 12. The coil 10 is energised by an electronic circuit 14, such that a predetermined electromagnetic field is developed within the fluid inside the pipe 12. The effect thereof is that the depositing of limescale is prevented or even counteracted. Details of this whole process can be derived from the various prior art publications and other publications which are readily available to the expert in this field.

In agreement with the invention the system comprises furthermore a field measuring coil 16 which is preferably installed around the same pipe 12 alongside the field generating coil 10 at no or short distance from said coil 10. The measuring coil 16 is connected to field strength measuring electronics 18 such that in fact the coil 16 in combination with the electronics 18 forms a field strength meter. Such field strength meters are in general known for various purposes and therefore a detailed information thereof is considered superfluous.

To obtain a proper feedback circuit between the field strength meter electronics 18 and the field generating electronics 14 it is preferred that the electronic circuit 14 comprises a signal generator 20 and a variable amplifier 22. The signal generator 20 generates a signal of the required shape and frequency and the amplifier 22 takes care that the amplitude of this signal is at the correct value for energising the coil 10 in such a manner that a field of the required strength is developed inside the tube 12.

If there were no other fields or no other external influences the system comprising the coil 10 and the electronics 14 could be calibrated once and would then function properly. However, under practical circumstances one has to reckon with various different external influences. First of all the dimensions of the tube 12 are not always the same. The diameter of the tube may vary (in The Netherlands standard diameters of 9, 12, 15, 18 and 22 mm are used for domestic waterpipes) and furthermore the thickness of the wall of the tube is not always the same and may vary dependent on the quality and the maker of the tube 12. For industrial purposes pipe sizes will vary mainly from 22 mm to 1000 mm.

Further external influences are for instance the electromagnetical fields generated by domestic appliances, such as washing machines, driers, ironing irons, etc. Under industrial circumstances one has to reckon with electromagnetical fields generated by pumps, electric motors, transformers, high voltage cables, etc.

To cope with these external influences the acrual field generated at each moment is measured by the combination of coil 16 and field strength electronics 18. The electronics circuit 18 now delivers a signal to the amplifier 22 by means of which the amplification value of the amplifier 22 is adapted such that even in the presence of varying external fields always an electromagnetical field of the required properties is developed inside the tube 12.

It is preferred that the coil 16 is positioned alongside the generating coil 10. One could imagine a situation whereby the coil 16 is installed around the coil 10. In that case, however, the inner space within the coil 10 is filled by the tube 12 and the therethrough flowing fluid whereas the inner space within the coil 16 is filled with not only the tube 12 and the therethrough flowing fluid, but also with the windings of the coil 10. In other words, the measuring circumstances are not equal to the generating circumstances. Therefore, a position of the coil 16 alongside the coil 10 is preferred.

Figure 2:
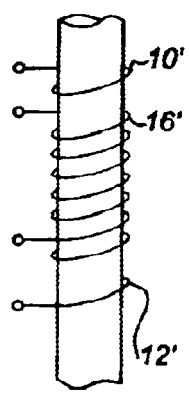
FIG. 2 illustrates another embodiment of the combined coils.

An alternative could be embodying the coil 10 with windings which have some intermediate distance whereby the windings of the coil 16 are positioned inside said intermediate gaps. In that case exactly the generated field is measured. The disadvantage, however, is the rather complicated coil construction. A practical example of this embodiment is illustrated in FIG. 2. The field generating coil is indicated by 10 and the measuring coil is indicated by 16. The coils are positioned around a pipe 12.

Figure 3:
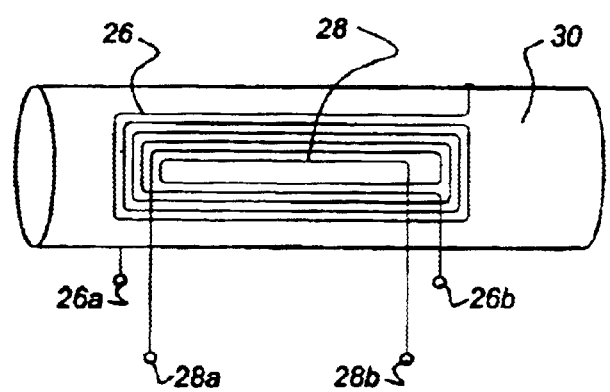
FIG. 3 illustrates another shape of the field generating coil.

In the embodiments of FIG. 1 and FIG. 2 the field generating coil produces a field parallel to the direction of the fluid flow in the pipe. It is possible to embody the coils such that the direction of the field is perpendicular to the flow direction. FIG. 3 illustrates an embodiment whereby the field generating coil is divided into two sections, one of which, section 26, is positioned on an arbitrary side of the pipe 30 and the other section, 26, which is not visible in the figure, is positioned on the opposite wall of the pipe 30. The coil 26 has the terminals 26a and 26b. Inside the coil section 26 the measuring coil 28 is positioned. The coil 28 has the terminals 28a and 28b. Also coil 28 could comprise two sections, a section on the visible surface of the pipe 30 and another section at the opposite, non-visible side of the pipe 30.

In general the field, generated by the field generating coil, is an alternating field with a frequency higher than 1 kHz and smaller than 100 kHz. To eliminate the influence of any fields outside this range it is preferred that the electronics circuit 18 comprises a band pass filter 24 for filtering out too low and too high frequencies. The upper and lower limit of the band pass filter 24 eventually can be adjustable.

I claim:

1. System for treating fluids in a pipe to resist scale deposits from building up in the pipe, comprising:
   a field generating coil mounted exteriorly of the pipe;
   an electronic circuit for energizing the field generating coil to develop an alternating electromagnetic field in the fluid;
   a sensor for sensing a parameter related to the functioning of the system and for generating a parameter dependent signal;
   a feed back circuit for feeding back said parameter dependent signal to said electronic circuit to control said electronic circuit;
   wherein
   the sensor comprises a field measuring coil mounted exteriorly of said pipe near the field generating coil; and
   the feedback circuit comprises field strength measuring electronics which together with said measuring coil act as a field strength meter.

2. The system according to claim 1, wherein the field measuring coil is positioned alongside the field generating coil with no or small intermediate distance.

3. The system according to claim 2, wherein the electronic circuit for energizing the field generating coil comprises an amplifier and a signal generator, and the amplification value is adjusted as a function of the signal from the field strength meter.

4. The system according to claim 1, wherein the electronic circuit for energizing the field generating coil comprises an amplifier and a signal generator, and the amplification value is adjusted as a function of the signal from the field strength meter.

5. The system according to claim 1, wherein the feed back circuit comprises a band filter.

* * * * *